United States Patent [19]
Hase et al.

[11] Patent Number: 5,830,582
[45] Date of Patent: Nov. 3, 1998

[54] FLAME-RETARDANT RESIN LAMINATE

[75] Inventors: Hiroaki Hase; Shinichi Akitaya, both of Ichihara, Japan

[73] Assignee: Chisso Corporation, Osaka, Japan

[21] Appl. No.: 720,431

[22] Filed: Sep. 30, 1996

[51] Int. Cl.$^6$ .................................................. B32B 27/08
[52] U.S. Cl. ..................... 428/516; 524/100; 524/123; 524/127; 524/416
[58] Field of Search ............................ 428/516; 524/100, 524/416, 123, 127

[56] References Cited

U.S. PATENT DOCUMENTS

| | | | |
|---|---|---|---|
| 4,154,718 | 5/1979 | Miyata et al. | 260/42.14 |
| 4,396,730 | 8/1983 | Imahashi | 523/200 |
| 4,504,610 | 3/1985 | Fontanelli et al. | 524/96 |
| 4,615,831 | 10/1986 | Kanno et al. | 252/609 |
| 4,966,931 | 10/1990 | Akitaya et al. | 524/100 |
| 5,130,357 | 7/1992 | Akitaya et al. | 524/100 |
| 5,213,783 | 5/1993 | Fukumura et al. | 423/305 |
| 5,286,576 | 2/1994 | Srail et al. | 428/516 |
| 5,430,080 | 7/1995 | Iwata et al. | 524/415 |
| 5,514,743 | 5/1996 | Pernice et al. | 524/577 |

FOREIGN PATENT DOCUMENTS

| | | |
|---|---|---|
| 0045835 | 2/1982 | European Pat. Off. . |
| 0414110 | 2/1991 | European Pat. Off. . |
| 0540803 | 5/1993 | European Pat. Off. . |
| 53-92855 | 8/1978 | Japan . |
| 54-29350 | 3/1979 | Japan . |
| 54-77658 | 6/1979 | Japan . |
| 56-26954 | 3/1981 | Japan . |
| 57-87462 | 5/1982 | Japan . |
| 9510842 | 4/1995 | WIPO . |

OTHER PUBLICATIONS

Kaiser et al., "Cyanuric Chloride Derivatives. II. Substituted Melamines", J. Am. Chem. Soc., vol. 73, 1951, pp. 2984–2986.

Anelli et al., "Doubly and Triply Bridged Polyoxapolyaza-heterophanes Derived from 2,4,6–Trichloro–s–triazine", J. Org. Chem., vol. 49, No. 22, 1984, pp. 4197–4203.

Kirk–Othmer, Concise Encyclopedia of Chemical Technology, Wiley–Interscience, pp. 815–816 (1985).

*Primary Examiner*—Melvyn I. Marquis
*Attorney, Agent, or Firm*—Leydig, Voit & Mayer

[57] ABSTRACT

Disclosed is a flame-retardant resin laminate including a layer formed from a flame-retardant olefin resin composition and a layer formed from an olefin resin, wherein the flame-retardant olefin resin composition comprises 2.5 to 67% by weight of ammonium polyphosphate, 0.4 to 52.5% by weight of a nitrogen-containing organic compound, and 30 to 90% by weight of an olefin resin and has a weight ratio of the nitrogen-containing organic compound to the ammonium polyphosphate of 0.05 to 3. The flame-retardant resin laminate hardly generates black smoke or toxic gas, even when exposed to high temperatures or contacted with flames, and has excellent appearance, printability, weathering resistance and scratch resistance.

12 Claims, No Drawings

FLAME-RETARDANT RESIN LAMINATE

FIELD OF THE INVENTION

The present invention relates to a flame-retardant resin laminate comprising a layer of a flame-retardant olefin resin composition and a layer of an olefin resin. More particularly, the invention relates to a flame-retardant resin composition which hardly generates black smoke or toxic gas even when exposed to high temperatures or contacted with flames (sometimes referred to as "flame contact" hereinafter) and has excellent appearance, printability, weathering resistance and scratch resistance.

BACKGROUND OF THE INVENTION

Olefin resins have been conventionally molded into sheets or films, and these sheets or films have been used for wall paper or building materials because of their excellent appearance, printability, weathering resistance, scratch resistance and fablication quality. However, the wall paper or the building materials come to have marketing needs for flame retardance. Although there are several methods to impart flame retardance to the olefin resins, most widely used is a method of compounding flame retarders with the olefin resins. Examples of the flame retarders include compositions comprising organic halogen compounds and antimony trioxide (sometimes referred to as "halogen flame retarders" hereinafter), metallic hydroxides exerting flame retardance effect (sometimes referred to as "inorganic flame retarders" hereinafter), ammonium polyphosphates and triazine derivatives.

However, the sheets or films using compositions wherein the halogen flame retarders are compounded with the olefin resins generate black smoke when contacted with flames, and besides they generate halogen gases having toxicity and corrosiveness, so that there resides a problem of exerting bad influences on human bodies, machines and environment. In Japanese Patent Laid-Open Publications No. 92855/1978, No. 29350/1979, No. 77658/1979, No. 26954/1981, No. 87462/1982 and No. 110738/1985, there are disclosed compositions wherein the inorganic flame retarders comprising magnesium hydroxide, aluminum hydroxide or hydrotalcite are compounded with the olefin resins. Sheets or films using these compounds hardly generate black smoke or toxic or corrosive gas when contacted with flames, but the inorganic flame retarders have a drawback such that they are low in a capacity of imparting the flame retardance into those compositions. Therefore, in order to satisfy the marketing needs of flame retardance, large amounts of the inorganic flame retarders must be compounded with the olefin resins. However, the compositions thus obtained have poor moldability, and it is difficult to make them lightweight.

In Japanese Patent Laid-Open Publications No. 147050/1984, No. 193347/1989 and No. 263851/1990, there are disclosed the sheets or films using compositions wherein the ammonium polyphosphate or the triazine derivatives are compounded with the olefin resins. These sheets or films can be easily molded, are hardly decreased in moldability or extrusion moldability, and hardly generate toxic gas or corrosive gas when molded or contacted with flames. However, they have problems in appearance, coating properties, printability, weathering resistance and scratch resistance, and besides bleed out of the flame retarders may take place to further mar the appearance.

OBJECT OF THE INVENTION

It is an object of the present invention to provide for a flame-retardant resin laminate which is free from such problems associated with prior art as described above and comprises a layer of a flame-retardant resin composition and a layer of an olefin resin, particularly to provide a flame-retardant resin laminate which hardly generates black smoke, toxic gas, etc., even when exposed to high temperatures or contacted with flames and has excellent printability, weathering resistance and scratch resistance.

SUMMARY OF THE INVENTION

The flame-retardant resin laminate of the present invention comprises:

a layer (E) formed from a flame-retardant olefin resin composition (D) comprising 2.5 to 67% by weight, preferably 5.6 to 45.5% by weight of ammonium polyphosphate (A), 0.4 to 52.5% by weight, preferably 1.36 to 31.2% by weight of a nitrogen-containing organic compound (B) and 30 to 90% by weight, preferably 50 to 85% by weight of an olefin resin (C) and having a weight ratio of the nitrogen-containing organic compound (B) to the ammonium polyphosphate (A) ((B)/(A)) of 0.05 to 3, preferably 0.1 to 0.6; and a layer (F) formed from an olefin resin (G).

In the flame-retardant resin laminate of the present invention, a thickness ratio of the layer (E) to the layer (F) (layer (E)/layer (F)) is preferably 0.5 to 100, preferably 0.8 to 50; particularly 0.8 to 30.

In the invention, examples of the olefin resin (C) used for the layer (E) include a crystalline ethylene homopolymer, a crystalline ethylene/α-olefin copolymer, a crystalline propylene/α-olefin copolymer and a crystalline propylene homopolymer.

The flame-retardant resin laminate of the invention preferably has a thickness of 0.02 to 5 mm, preferably 0.05 to 3 mm.

In the flame-retardant resin laminate of the invention, the nitrogen-containing organic compound (B) used for the layer (E) includes a homopolymer or copolymer formed from a unit represented by the following formula (1), a reaction product of cyanuric chloride and diamine, heterocyclic nitrogen compounds, a reaction product of a heterocyclic nitrogen compound and aldehyde, and a a reaction product of a heterocyclic nitrogen compound and a diphenyl carbonate and derivatives of those reaction products;

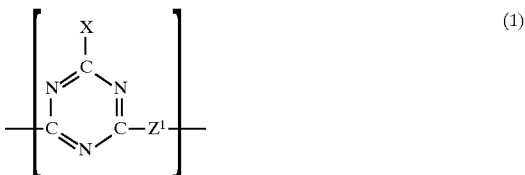

wherein X is an alkylamino group represented by the formula —$NHR^1$ or —$NR^2R^3$ ($R^1$, $R^2$ and $R^3$ are each a linear or branched alkyl group of 1 to 6 carbon atoms, and $R^2$ and $R^3$ may be identical to or different from each other), a morpholino group, a piperidino group or a hydroxyalkylamino group represented by —$NHR^4$ or —$NR^5R^6$ ($R^4$, $R^5$ and $R^6$ are each a linear or branched hydroxyalkyl group of 2 to 6 carbon atoms, and $R^5$ and $R^6$ may be identical to or different from each other); and $Z^1$ is a piperazinylene group, a group represented by —$NH(CH_2)_mNH$— (m is 2 to 6) or a group represented by —$NR^7(CH2)_lR^8N$— (l is 2 to 6, $R^7$ and $R^8$ are each a linear branched alkyl group of 1 to 6 carbon atoms or a linear or branched hydroxyalkyl group of 2 to 6 carbon atoms, $R^7$ and $R^8$ are the same as or different from each other, and at least one of $R^7$ and $R^8$ is a hydroxyethyl group).

In the flame-retardant resin laminate of the invention, the layer (F) may be a stretched layer formed from the olefin resin (G).

DETAILED DESCRIPTION OF THE INVENTION

The present invention is described in detail hereinafter.

The flame-retardant resin laminate of the invention comprises a layer (F) formed from a specific flame-retardant resin composition (D) and a layer (E) formed from an olefin resin (G).

The flame-retardant resin composition (D) comprises an ammonium polyphosphate (A), a nitrogen-containing organic compound (B) and an olefin resin (C). There is no specific limitation on the ammonium polyphosphate (A) employable in the invention, but preferably used is a compound or composition represented by the following formula (2):

$$(NH_4)_{n+2}P_nO_{3n+1} \quad (2)$$

wherein n is not less than 2.

In the formula (2), n is preferably not less than 10, more preferably not less than 100 because the water solubility of the ammonium polyphosphate represented by the formula (2) can be lowered to improve water resistance. The resulting flame-retardant olefin resin laminate does not substantially bleed ammonium polyphosphate, which is caused by water or water vapor in air. Preferable are ammonium polyphosphate whose particles are coated with a thermoplastic resin, and ammonium polyphosphate coated with melamine by means of addition and/or adsorption (referred to as "melamine-coated ammonium polyphosphate" hereinafter) in order to lower the water solubility. Of these, melamine-coated ammonium polyphosphate is more preferable.

As the ammonium polyphosphate (A), a commercially available one is employable. Examples of the commercially available ammonium polyphosphates include SUMISAFE-P (trade name, available from Sumitomo Chemical Co., Ltd.), EXOLIT-422 (trade name, available from Hoechst AG.), EXOLIT-462 (trade name, available from Hoechst AG.), EXOLIT-700 (trade name, available from Hoechst AG.) and PHOS-CHECK P/40 (trade name, available from Monsanto Co.).

Also employable as the ammonium polyphosphate (A) are ammonium polyphosphate fine particles (crystal form II) described in Japanese Patent Laid-Open Publication No. 300204/1992. The ammonium polyphosphate fine particles (crystal form II) car be obtained by, for example, the following process. That is, diammonium phosphate and phosphorus pentaoxide are mixed in equimolar amounts and heated at a temperature of 290° to 300° C. with stirring. To the mixture, a urea solution (concentration: 77% by weight), in which urea is dissolved in an amount of 0.5 times by mol as much as the diammonium phosphate, is added by means of spraying. Then, the mixture is calcined at a temperature of 250° to 270° C. for several hours in an ammonia atmosphere, to obtain the ammonium polyphosphate fine particles (crystal form II).

The melamine-coated ammonium polyphosphate suitably employable for the ammonium polyphosphate (A) can be prepared by using melamine which is commercially available as melamine monomer. The melamine-coated ammonium polyphosphate is, for example, prepared by the following process. In the first step, powdery ammonium polyphosphate represented by the formula (2) is fed to a heating-kneading apparatus (e.g., kneader) preheated. Then, the ammonium polyphosphate is heated for 0.5 to 5 hours at such a temperature that the ammonium polyphosphate particles are not melted and ammonia in the ammonium polyphosphate is easily eliminated, i.e., not higher than 300° C., preferably 200° to 300° C. As a result, ammonia, which is inherently present in a stoichiometric quantity in the ammonium polyphosphate, is partly eliminated (5 to 10% by weight based on the stoichiometric quantity of ammonia), to produce ammonium polyphosphate lacking some ammonia and having pH of 4.0 to 6.0 in terms of a 1 wt. % aqueous solution of the ammonium polyphosphate from which some ammonia is eliminated. Alternatively, ammonium polyphosphate wherein the quantity of the ammonia bonded is less than the stoichiometric quantity is produced in a conventional process for preparing ammonium polyphosphate. These ammonium polyphophates are referred to as "ammonia-short ammonium polyphosphates" hereinafter. In the second step, for example, in the same apparatus as described above, the ammonia-short ammonium polyphosphate powder is heated at a temperature at which the ammonium polyphosphate particles are not melted and melamine can be sublimated (i.e., 250°–300° C.), and melamine is added thereto. As a result, ammonia is eliminated from the surface of the ammonia-short ammonium polyphosphate particles to alter the ammonium polyphosphate to an acid, and the melamine is added and/or adsorbed on the hydroxyl groups of the acid.

The term "addition" used herein means such a state that the melamine is ionically-bonded to the acidic hydroxyl groups derived from ammonium polyphosphate. In this state, the melamine is stable even when heated, and is not eliminated again. The term "adsorption" means such a state that the melamine is physically adsorbed on the surfaces of the ammonium polyphosphate particles. The melamine repeatedly undergoes sublimation from the surfaces of the ammonium polyphosphate particles and adsorption thereon when continuously heated, whereby the melamine is ionic-bonded to the acidic hydroxyl groups. The amount of the melamine used herein is 0.5 to 20% by weight, preferably 2 to 10% by weight, based on the amount of the ammonium polyphosphate. A total amount of the melamine used is subjected to addition and/or adsorption on the ammonium polyphosphate, to obtain melamine-coated ammonium polyphosphate.

There is no specific limitation on the nitrogen-containing organic compound (B) employable for the layer (E) in the invention, as far as the nitrogen-containing organic compound is thermally decomposed by exposure to high temperatures of flames or the like in the presence of the olefin resin (C) and the ammonium polyphosphate (A) used in the invention, thereby to generate nonflammable gas (e.g., water vapor, carbon dioxide, nitrogen) and to produce carbonaceous residue. Examples of the nitrogen-containing organic compounds include polymers comprising units each represented by the following formula (1), reaction products of cyanuric chloride and diamines, heterocyclic nitrogen compounds, reaction products of heterocyclic nitrogen compound and aldehyde, reaction products of heterocyclic nitrogen compound and diphenyl carbonate, and derivatives of those reaction products.

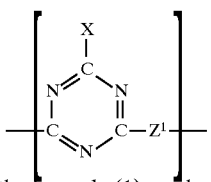

(1)

In the formula (1), each of X and $Z^1$ is a group containing a nitrogen atom through which the group is linked to triazine skeleton. That is, X is an alkylamino group represented by —$NHR^1$ or —$NR^2R^3$ ($R^1$, $R^2$ and $R^3$ are each a linear or branched alkyl group of 1 to 6 carbon atoms, and $R^2$ and $R^3$ may be identical to or different from each other), a morpholino group, a piperidino group or a hydroxyalkylamino group represented by —$NHR^4$ or —$NR^5R^6$ ($R^4$, $R^5$ and $R^6$ are each a linear or branched hydroxyalkyl group of 2 to 6 carbon atoms, and $R^5$ and $R^6$ may be identical to or different from each other), $Z^1$ is a piperazinylene group, a group represented by —$NH(CH_2)_mNH$— (m is 2 to 6) or a group represented by —$NR^7(CH2)_lR^8N$— (l is 2 to 6, $R^7$ and $R^8$ are each a linear or branched hydrocarbon group of 1 to 6 carbon atoms or a linear or branched hydroxyalkyl group of 2 to 6 carbon atoms, $R^7$ and $R^8$ are the same as or different from each other and at least one of $R^7$ and $R^8$ is a hydroxyethyl group).

The polymer comprising units each represented by the formula (1) may be a homopolymer in which X and $Z^1$ of the units are identical with each other or a copolymer in which X or $Z^1$ contained in at least one unit is different from that of another unit.

The homopolymers or copolymers comprising the units represented by the above formula may be polymers of low polymerization degree, namely, oligomers. Of the homopolymers or copolymers comprising the unit represented by the formula (1), preferable are homopolymers formed from units of 2-piperazinylene-4-morpholino-1,3,5-triazine, 2-piperazinylene-4-piperidino-1,3,5-triazine, 2-piperazinylene-4-N,N-bis(2-hydroxylethyl)amino-1,3,5-triazine and 2-piperazinylene-4-N-(2-hydroxyethyl)amino-1,3,5-triazine, from the viewpoint of excellent flame retardance of the resulting laminates. Of these, more preferable are homopolymers formed from units of 2-piperazinylene-4-morpholino-1,3,5-triazine and 2-piperazinylene-4-piperidino-1,3,5-triazine. Particularly preferable are a homopolymer obtained by low polymerization of 2-piperazinylene-4-morpholino-1,3,5-triazine (true density: 1.3 g/cc, having no melting point (Tm), decomposition temperature: about 304° C., insoluble in many organic solvents, solid) and a homopolymer of 2-piperazinylene-4-piperidino-1,3,5-triazine (having no melting point (Tm), decomposition temperature: about 324° C., insoluble in many organic solvents, solubility in water at room temperature: not more than 0.1% by weight, solid).

Of the reaction products of cyanuric chloride and diamines, preferable are products obtained by reacting cyanuric chloride and diamines in a molar ratio of 2/3 (cyanuric chloride/diamines), for example, a product obtained by reacting cyanuric chloride and ethylenediamine in a molar ratio of 2/3 (cyanuric chloride/ethylenediamine), and a product obtained by reacting cyanuric chloride and 1,3-diaminopropane in a molar ratio of 2/3 (cyanuric chloride/1,3-diaminopropane), from the viewpoint off excellent flame retardance of the resulting laminates. Of these, more preferable is a product obtained by reacting cyanuric chloride and ethylenediamine.

The reaction products of cyanuric chloride and diamines can be easily synthesized in accordance with processes described in known literature. For example, in research by DONALD W. K. et al. (J. Am. Chem. Soc. 73, 2984–2986, 1951), derivatives of the reaction products or cyanuric chloride and diamines in a ratio of 1:1 are introduced. In researches by ANELLI. PL. et al. (J. Org. Chem. 49, 4197–4203, 1984), structures of the reaction products of cyanuric chloride and diamines are discussed in detail. The reaction products relating to the present invention are presumed to have structures similar to those described in the above literature, but because of their insolublity in water and organic solvents generally known, it is difficult to measure molecular weights of the reaction products.

Next, a conventional process for synthesizing reaction products of cyanuric chloride and diamines is described in detail.

Three active chlorine atoms of the cyanuric chloride are replaced one by one with amino groups, whereby the reactivity of the residual active chlorine atom is markedly decreased. That is, the chlorine atoms are replaced with the amino groups one after another and, unless the reaction temperature is increased, it becomes gradually difficult for the amino group to react with the residual chlorine atom. Therefore, the reaction is divided into three stages according to the active chlorine replaced with the amino group.

In the first stage, cyanuric chloride is dispersed in a polar solvent such as acetone or water at 0° to 10° C. and is caused to react with diamines in a molar ratio of 2:1 in the presence of an alkali such as NaOH or KOH or tertiary amine such as pyridine or triethylamine. The term "diamines" used herein is a general name for primary or secondary, linear or branched diamines represented by the formula $HNR^1(CH_2)_nR^2NH$ {n is an integer of 2 to 6, and $R^1$ and $R^2$ are each H or $C_mH_{2m+1}$ (m is an integer of 1 to 3)} and diamines including piperazine or piperazine ring.

Examples of the diamines include ethylenediamine, 1,3-diaminopropane, 1,4-diaminobutane, 1,5-diaminopentane, hexamethylenediamine, N,N'-dimethylethylenediamine, N,N'-diethylethylenediamine, N,N'-diphenylethylenediamine, piperazine, methylpiperazine, diketopiperazine and 1-aminoethylpiperazine.

In the second stage, for example, the reaction product synthesized in the first stage is filtered and dried, and resulting intermediate is used as a starting material. To 1 mol of the intermediate are added 1 mol of diamines, 2 mol of alkali such as NaOH or KOH or tertiary amine such as pyridine or diethylamine, and they are reacted at 40° to 80° C., preferably 50° to 70° C. In this reaction, any of a polar solvent such as acetone, THF (tetrahydrofuran) or dichloromethane and a non-polar solvent such as benzene or carbon tetrachloride is employable.

In this second stage, the reaction product obtained by the first stage may not be separated by filtration and drying. In this case, to the reaction solution of the first stage, diamines in amounts equimolar with the cyanuric chloride initially fed and alkali in amounts of two times by mol as much as the cyanuric chloride are added to perform reaction. After the reaction of the second stage is completed, the reaction product is separated by filtration and drying, or is subjected to azeotropy so as to exchange the solvent in order to use the resultant in the third stage. However, when a high-boiling solvent such as water or xylene is used in the reaction of the first and second stages, the solvent can be per se used in the reaction of the third stage.

In the third stage, the reaction preceeds in the same manner as in the second stage at a temperature of not lower than 100° C. using a high-boiling solvent such as water, xylene or dimethyl sulfoxide. After the reaction, the product is filtered, washed and dried to obtain, as a white or light yellow solid, a synthesized product used in the invention. The reaction product thus obtained is combined with the specific phosphorus compound to give a flame retarder.

Examples of the heterocyclic nitrogen compounds include ethyleneurea, ethylenethiourea, hidantoin, hexahydropyrimidine-2-one, piperazine-3,6-dione, barbituric acid, uric acid, piperazine, morpholine, imidazolidine-2-one, melamine, ammelide, ammeline, cyanuric acid, guanamine, benzylguanamine, 2-mercaptobenzimidazole, thiouracil, methylthiouracil and 2-mercaptobenzothiazole.

Of the reaction products of the heterocyclic nitrogen compounds and aldehyde, preferable are a reaction product of ethyleneurea and formaldehyde, a reaction product of ethylenethiourea and formaldehyde, a reaction product of benzylguanamine and aldehyde, and derivatives of isocyanuric acid, such as tris(2-hydroxyethyl)isocyanurate, tris(3-hydroxy-N-propyl)isocyanurate and tris(2,3-epoxypropyl) isocyanurate, from the viewpoint of excellent flame retardance of the resulting laminates. Of these, more preferable are a reaction product of ethyleneurea and formaldehyde and a reaction product of ethylenethiourea and formaldehyde.

The reaction products of the heterocyclic nitrogen compounds and aldehyde can be prepared by, for example, the following process. That is, 50 g of ethylenethiourea is dissolved in 1 liter of water and mixed with diluted acid (e.g., diluted sulfuric acid or phosphoric acid) to adjust pH of the solution to 2. The solution is then heated to 90° C., and thereto is dropwise added an aqueous solution of formaldehyde having a concentration of 37% by weight until the $CH_2O$/ethylenethiourea molar ratio becomes 2. The resulting mixture is vigorously stirred with keeping the temperature at 90° C. The precipitate obtained in the extremely fine state is filtered, washed with water and dried to obtain the desired product.

The reaction products of the heterocyclic nitrogen compound and diphenyl carbonate include reaction products prepared by reacting the diphenyl carbonate with piperadine or imidazoline-2-one at a mol ratio of 1:1.

The reaction products of the heterocyclic nitrogen compound and diphenyl carbonate can be prepared by, for example, the following process. That is, 112 g (0.52 mol) of diphenyl carbonate and 44.8 g (0.52 mol) of piperadine anhydride are introduced into an autoclave and heated in an oil bath at 170°–190° C. for 6 hours. After cooling, the resultant product is transferred into a two-necked flask in which phenol generated during the above reaction is removed at 250° C. under the reduced pressure.

After cooling, the resultant product is harvested, ground, washed with water and dried to obtain an aimed product.

There is no specific limitation on the olefin resin (C) employable in the invention. Examples of the olefin resins (C) include crystalline propylene homopolymers, crystalline propylene/α-olefin copolymers, crystalline ethylene homopolymers, crystalline ethylene/α-olefin copolymers, ethylene/α-olefin copolymer elastomers, ethylene/propylene/non-conjugated diene copolymer elastomers, partially crosslinked products of crystalline ethylene homopolymers and ethylene/propylene/nonconjugated diene copolymer elastomers, and partially crosslinked products of crystalline propylene polymers and ethylene/propylene/nonconjugated diene copolymer elastomers. Of these, preferable are crystalline ethylene homopolymers, crystalline ethylene/α-olefin copolymers, crystalline propylene/α-olefin copolymers and crystalline propylene homopolymers, from the viewpoints of abrasion resistance, mechanical strength and economical effects. Examples of the α-olefins include ethylene, propylene, 1-butene, 1-pentane, 1-hexane, 4-methyl-1-pentane, 1-Neptune, 1-octane and 1-deacon.

The flame-retardant olefin resin composition (D) used in the invention comprises 2.5 to 67% by weight, preferably 5.6 to 45.5% by weight of the ammonium polyphosphate (A), 0.4 to 52.5% by weight, preferably 1.36 to 31.2% by weight of the nitrogen-containing organic compound (B) and 30 to 90% by weight, preferably 50 to 85% by weight of the olefin resin (C). If a flame-retardant olefin resin composition comprising the ammonium polyphosphate (A), the nitrogen-containing organic compound (B) and the olefin resin (C) and having a content of the olefin resin (C) of much greater than 90% by weight is used, the resulting laminate hardly exhibit flame retardance. A flame-retardant olefin resin composition comprising the components (A), (B) and (C) and having a content of the component (C) of much lower than 30% by weight does not exhibit good moldability when molded into a flame-retardant resin laminate.

The flame-retardant olefin resin composition (D) has a weight ratio of the nitrogen-containing organic compound (B) to the ammonium polyphosphate (A) of 0.05 to 3 (nitrogen-containing organic compound (B)/ammonium polyphosphate (A)). This ratio is preferably 0.1 to 0.6 because a laminate produced using the resulting flame-retardant olefin resin composition exhibits flame retardance from the beginning of contact with flames or exposure to high temperatures of flames.

Owing to synergistic effects of the ammonium polyphosphate (A) and the nitrogen-containing organic compound (B), the flame-retardant olefin resin composition (D) hardly generates corrosive gas, halogen gas or toxic gas not only in the molding process but also in the contact with flames, and the composition only produces nonflammable gas and carbonaceous residue.

The flame-retardant polyolefin resin composition (D) can be prepared by, for example, the following process. That is, given amounts of the olefin resin (C), the ammonium polyphosphate (A) and the nitrogen-containing organic compound (B) are compounded, then fed to a stirring-mixing apparatus such as Henschel mixer, super mixer or tumbling mixer, and stirred therein for 1 to 10 is minutes, to obtain the flame-retardant composition. If desired, the composition may be melt kneaded by a melt kneading machine such as roll kneader, Banbury mixer (trade name) or screw extruder at a melt kneading temperature of 120° to 250° C., to obtain a composition in the form of pellets.

The flame-retardant polyolefin resin composition (D) can be compounded with various additives, such as antioxidant, antistatic agent, copper harm inhibitor, neutralizing agent (e.g., stearic acid metallic salt, hydrotalcite), ultraviolet light absorber, anti-aging agent, lubricant, mineral oil, silane coupling agent, titanate coupling agent and pigment, within limits not prejudicial to the objects of the present invention.

Examples of the olefin resin (G) employable for the layer (F) in the invention include polyolefin elastomers, such as ethylene/propylene copolymer elastomers (EPM), ethylene/propylene/nonconjugated diene copolymer elastomers (EPDM), partially crosslinked products of compositions of ethylene crystalline polymers and ethylene/propylene/nonconjugated diene copolymer elastomers, and partially crosslinked products of compositions of propylene crystalline polymers and ethylene/propylene/nonconjugated diene copolymer elastomers, crystalline propylene homopolymers, crystalline ethylene homopolymers, crystalline propylene/α-olefin copolymers and crystalline ethylene/α-olefin copolymers. Examples of the α-olefins include ethylene, propylene, 1-butene, 1-pentene, 1-hexene, 4-methyl-1-pentene, 1-nonene 1-octene and 1-decene.

The olefin resin (G) can be mixed with various additives, such as an antioxidant, an anti static agent, a copper harm inhibitor, a neutralizing agent (e.g., a stark acid metallic salt,), an ultraviolet light absorber, an anti-aging agent, a lubricant, a mineral oil, a silane coupling agent, a titanate coupling agent, pigment, a foaming agent, a petroleum resin, an inorganic filler and an organic filler, within limits not prejudicial to the objects of the present invention.

There is no specific limitation on the inorganic filler, and various kinds of fillers are employable. Examples of the inorganic fillers include oxides of magnesium, calcium, barium and aluminum, hydroxides thereof, silicates thereof, carbonates thereof, sulfates thereof, silica, glass fiber and clay. Examples of the organic fillers include woodmeal.

The flame-retardant resin laminate of the invention is a flame-retardant resin laminate comprising a layer (E) and a layer (F), and has a laminate structure comprising plural layers such as two, three, four or five layers. The layer (E) may be used as any of a surface layer and an intermediate layer of the flame-retardant resin laminate. The flame-retardant resin laminate of the invention may be a laminate having, for example, the following laminate structure.

A flame-retardant resin laminate of a four-layered structure consisting of layers (E) as surface layers, and a layer (F) and a layer (E) as intermediate layers (provided that the olefin resin (C) used for the layer (E) as the intermediate layer and the olefin resin (C) used for the layers (E) as the surface layers are different from each other, for example, they are a crystalline propylene homopolymer and a crystalline ethylene homopolymer, respectively); and a flame-retardant resin laminate of a five-layered structure consisting of a layer (E), a layer (F) and a layer (E) as an intermediate layer of a two-kind three-layered structure, and layers (F) as surface layers.

The flame-retardant resin laminate of the invention preferably has a laminate structure comprising a layer (E) as an intermediate layer and layers (F) as surface layers, because such laminate shows more excellent appearance (bleed resistance), scratch resistance, printability and other properties.

In the flame-retardant resin laminate of the present invention, a thickness ratio of the layer (E) to the layer (F) is preferably 0.5 to 100 (layer (E)/layer (F)), more preferably 0.8 to 50, particularly 0.8 to 30, from the viewpoints of film forming properties and flame retardance of the laminate. In the case of a flame-retardant resin laminate having a layer structure of three or more layers, this ratio means a ratio of the total thickness of the layers (E) to the total thickness of the layers (F).

The flame-retardant resin laminate can be prepared by various methods, e.g., a method of multi-layer extrusion, a method of laminating the layer (E) of a single-layer structure and the layer (F) of a single-layer structure one upon the other, and a method of laminating the layer (F) on the layer (E) of a single-layer structure using cast film extrusion.

As the multi-layer extrusion method, there can be mentioned, for example, a method wherein plural extruders and a multi-layer extrusion T-die are used and the flame-retardant olefin resin composition (D) and the olefin resin (G) are fed to the extruders so as to obtain a flame-retardant resin laminate.

As the method of laminating the layer (E) of a single-layered structure and the layer (F) of a single-layered structure one upon the other, there can be mentioned, for example, a method wherein a surface of the layer (E) of a single-layer structure and a surface of the layer (F) of a single-layer structure are heated to melt-bond them together, and a method wherein the layer (E) of a single-layer structure and the layer (F) of a single-layer structure are laminated together using an adhesive or an adhesive film which does not mar the objects of the present invention. Of these, a method of laminating those layers by melt bonding is preferable.

The layer (E) of a single-layer structure can be prepared by, for example, a T-die method using an extruder, an inflation method, a calendering method, a press molding method or an injection molding method.

The layer (F) of a single-layer structure can be prepared by, for example, a T-die method using an extruder, an inflation method, a calendering method, a press molding method or an injection molding method. The layer of a single-layer structure obtained as above may be stretched to obtain a stretched film which can be used as the layer (F) of a single-layer structure. For the purpose of imparting a light and soft appearance or a soft touch to the flame-retardant resin laminate, a nonwoven sheet, an expanded layer or a pearl-like film formed from the olefin resin (G) can be used as the layer (F) of a single-layer structure.

EFFECT OF THE INVENTION

The flame-retardant resin laminate of the present invention hardly generates black smoke, toxic gas, etc., even when exposed to high temperatures or contacted with flames, and has excellent printability, weathering resistance and scratch resistance. Therefore, the flame-retardant resin laminate is very useful for residential interior materials (e.g., wall paper) and building materials.

EXAMPLE

The present invention will be further described with reference to the examples and the comparative examples, but it should be construed that the invention is in no way limited to the examples. Various embodiments wherein addition and/or modification easily made by a person skilled in the art is made on the following examples are within the scope of the present invention.

Evaluation of flame retardence

The flame retardance of a laminate or a single-layer sheet was evaluated in accordance with FMVSS-302. When the compositions of two surface layers were different from each other, flame was contacted from each surface side. The flame contact was stopped after 15 seconds from the beginning of the contact. The criteria of the evaluation are as follows. A laminate or a sheet which does not catch fire, which catches fire but the fire flame goes out before it reaches the index mark, or which catches fire and burns even after the fire flame exceeds the index mark at a burning rate of less than 50 mm/min, a distance burned of not more than 50 mm and the fire flame goes out within 30 seconds from the flame exceeds the index mark is characterized as a self-extinguishing laminate or sheet having excellent flame retardance. A laminate or sheet which burns even after the fire flame exceeds the index mark at a burning rate of not less than 50 mm/min and in which a distance burned is not less than 50 mm or a burning time is not shorter than 30 seconds is characterized as a flammable laminate or sheet which has poor flame retardance.

Evaluation of bleed resistance

A laminate or a single-layer sheet was cut to give a sample having a size of 50 mm×50 mm. The sample was allowed to stand in a constant-humidity, constant-temperature bath having a humidity of 80% and a temperature of 80° C. for 500 hours and was then allowed to stand in a desiccator at room temperature for 24 hours. The surface of the sample was subjected to visual observation and compared with two comparative samples. The bleed resistance of the laminate was evaluated based on the following three ranks (A, B, C), and it was taken as an index of weathering resistance and appearance.

The comparative samples were prepared in the following manner. A propylene homopolymer (melt flow rate (temperature of 230° C., load of 2.16 kgf): 6 g/10 min) was molded into a sheet having a thickness of 0.1 mm by means of an extruder (screw diameter: 20 mm, L/D=25, twin-screw bidirectional extruder, manufactured by Toyo Seiki K.K.) equipped with a T-die having a width of 150 mm. The sheet was cut to give a comparative sample having a size of 100×100 mm.

A: The laminate has an appearance almost the same as the comparative samples, and no spherical small substances are observed.

B: Spherical small substances are observed but they make no matter in the appearance.

C: Spherical small substances are observed and the appearance is bad.

Gloss before immersion

A laminate or a single-layer sheet was cut to give a sample having a size of 50 mm×50 mm. The gloss (%) of the sample was measured in accordance with the test conditions of JIS K7106 (specular gloss at 60°), and it was taken an index of appearance.

Gloss after immersion

A laminate or a single-layer sheet was cut to give a sample having a size of 50 mm×50 mm. The sample was immersed in hot water at 90° C. for 4 hours. Then, the gloss (%) of the sample was measured in accordance with the test conditions of JIS K7106 (specular gloss at 60°), and it was taken an index of appearance.

Listed below are olefin resins, ammonium polyphosphate, nitrogen-containing organic compounds and additives used in the following examples and comparative examples.

PP(1): Propylene/ethylene/1-butene copolymer (ethylene content: 5.3% by weight, 1-butene content: 4.5% by weight, MFR (temperature of 230° C., load of 2.16 kg): 5 g/10 min)

PP(2): Propylene homopolymer resin (MFR (temperature of 230° C., load of 2.16 kg): 4 g/10 min)

PA(1): ammonium polyphosphate (trade name: Exolit 422, available from Hoechst AG.)

NC(1): Polymer of 2-piperazinylene-4-morpholino-1,3,5-triazine (n=11)

AD(1): Tetrakis[methylene-3-(3',5'-di-t-butyl-4-hydroxyphenyl)propionate]methane (trade name: Irganox 1010, available from Ciba-Geigy (Japan), Ltd.)

AD(2): Distearyl-3,3'-thio-di-propionate (trade name: DSTP[YOSHITOMI], available from Yoshitomi Pharmaceutical Industries, Ltd.)

AD(3): Aluminum/magnesium/hydroxycarbonate hydrate (hydrotalcite, trade name: DHT-4A, available from Kyowa Chemical Industry Co., Ltd.)

HA(1): Decabromodiphenyl oxide (trade name: DE83R, available from Great Lakes Chemical Co.)

AD(4): Antimony trioxide (available from Nihon Mining & Concentrating Co., Ltd.)

Example 1

In a Henschel mixer, 69% by weight of PP(1), 21% by weight of PA(1), 9% by weight of NC(1), 0.3% by weight of AD(1), 0.3% by weight of AD(2) and 0.4% by weight of AD(3) were mixed together, and the resulting mixture was melt kneaded at a temperature of 200° C. by means of a twin-screw extruder (screw diameter: 44 mm, L/D=45, trade name: KTX-44, manufactured by Kobe Steel, Ltd.) to obtain a composition (referred to as "composition (1)") in the form of pellets. The composition (1) was molded into a sheet having a thickness of 0.01 mm (referred to as "sheet (1)") by means of a twin-screw bidirectional extruder having a screw diameter of 20 mm and L/D of 25 (referred to as "extruder (1)" hereinafter, manufactured by Toyo Seiki Seisaku-sho, Ltd.), which was equipped with a T-die having a width of 150 mm.

Similarly, 99% by weight of PP(2), 0.3% by weight of AD(1), 0.3% by weight of AD(2) and 0.4% by weight of AD(3) were mixed together in a Henschel mixer, and the resulting mixture was melt kneaded at a temperature of 200° C. by means of a twin-screw extruder (screw diameter: 44 mm, L/D=45, trade name: KTX-44, manufactured by Kobe Steel, Ltd.) to obtain a composition (referred to as "composition (2)") in the form of pellets. The composition (2) was molded into a sheet having a thickness of 0.01 mm (referred to as "sheet (2)") by means of the extruder (1) equipped with a T-die having a width of 150 mm.

The sheet (1) and the sheet (2) were superposed one upon the other, and they were placed between metallic thin plates, followed by preheating at 160° C. for 2 minutes using a hot press. Then, those sheets were thermo-compression bonded at a press pressure per unit area of a laminate (referred to simply as "press pressure" hereinafter) of 5 kgf/cm$^2$ for 30 seconds, and cooled immediately with a hydraulic press, which was cooled by passing water, at a press pressure of 5 kg/cm$^2$ for 1 minute, to obtain a laminate (length: 360 mm, width: 120 mm, total thickness: 0.02 mm) consisting of a layer of the sheet (1) having a thickness of 0.01 mm and a layer of the sheet (2) having a thickness of 0.01 mm. The laminate was cut into a specimen of a given size (length: 356 mm, width: 102 mm) suitable for the test of FMVSS-302.

The laminate thus obtained was contacted with flame from each side of the sheet (1) and the sheet (2), to evaluate flame retardance. In the flame contact from each side, the laminate showed self-extinguishing properties, and smoke was hardly generated. The results of the evaluation for bleed resistance on the side of the sheet (2), gloss before immersion and gloss after immersion are set forth in Table 1.

Example 2

The composition (1) was molded into a sheet having a thickness of 0.1 mm (referred to as "sheet (3)") by means of the extruder (1) equipped with a T-die having a width of 150 mm.

The composition (2) was molded into a sheet having a thickness of 0.1 mm (referred to as "sheet (4)") by means of the extruder (1) equipped with a T-die having a width of 150 mm.

The sheet (3) and the sheet (4) were superposed one upon the other, and they were placed between metallic thin plates, followed by preheating at 160° C. for 2 minutes using a hot press. Then, those sheets were thermo-compression bonded at a press pressure of 5 kgf/cm$^2$ for 30 seconds, and cooled immediately with a hydraulic press, which was cooled by passing water, at a press pressure of 5 kg/cm$^2$ for 1 minute, to obtain a laminate (length: 360 mm, width: 120 mm, total thickness: 0.19 mm) consisting of a layer of the sheet (3) having a thickness of 0.1 mm and a layer of the sheet (4) having a thickness of 0.09 mm. The laminate was cut into a specimen of a given size (length: 356 mm, width: 102 mm) suitable for the test of FMVSS-302.

The laminate thus obtained was contacted with flame from each side of the sheet (3) and the sheet (4), to evaluate flame retardance. In the flame contact from each side, the laminate showed self-extinguishing properties, and smoke was hardly generated. The results of the evaluation for bleed resistance on the side of the sheet (4), gloss before immersion and gloss after immersion are set forth in Table 1.

Example 3

The composition (1) was molded into a sheet having a thickness of 0.8 mm (referred to as "sheet (5)") by means of the extruder (1) equipped with a T-die having a width of 150 mm.

The composition (2) was molded into a sheet having a thickness of 0.8 mm (referred to as "sheet (6)") by means of the extruder (1) equipped with a T-die having a width of 150 mm.

The sheet (5) and the sheet (6) were superposed one upon the other, and they were placed between metallic thin plates, followed by preheating at 160° C. for 2 minutes using a hot press. Then, those sheets were thermo-compression bonded at a press pressure of 15 kgf/cm$^2$ for 60 seconds, and cooled immediately with a hydraulic press, which was cooled by passing water, at a press pressure of 5 kg/cm$^2$ for 1 minute, to obtain a laminate (length: 360 mm, width: 120 mm, total thickness: 1.58 mm) consisting of a layer of the sheet (5) having a thickness of 0.78 mm and a layer of the sheet (6) having a thickness of 0.8 mm. The laminate was cut into a specimen of a given size (length: 356 mm, width: 102 mm) suitable for the test of FMVSS-302.

The laminate thus obtained was contacted with flame from each side of the flame-retardant olefin resin layer and the olefin resin layer, to evaluate flame retardance. In the flame contact from each side, the laminate did not catch fire and showed self-extinguishing properties. Besides, smoke was hardly generated. The results of the evaluation for bleed resistance on the side of the sheet (6), gloss before immersion and gloss after immersion are set forth in Table 1.

Example 4

The composition (1) was melted at 200° C. by means of a hot press and preheated for 5 minutes using a copper frame having a thickness of 1 mm, followed by pressing at a press pressure of 100 kgf/cm$^2$ for 1 minute. Then, the pressed composition was cooled with a cooling press, which was cooled by passing water, at a press pressure of 100 kg/cm$^2$ for 2 minutes, to obtain a sheet having a thickness of 1.03 mm (referred to as "sheet (7)").

Similarly, the composition (2) was melted at 200° C. by means of a hot press and preheated for 5 minutes using a copper frame having a thickness of 1 mm, followed by pressing at a press pressure of 100 kgf/cm$^2$ for 1 minute. Then, the pressed composition was cooled with a cooling press, which was cooled by passing water, at a press pressure of 100 kg/cm$^2$ for 2 minutes, to obtain a sheet having a thickness of 1.05 mm (referred to as "sheet (8)").

The sheet (7) and the sheet (8) were superposed one upon the other, and they were placed between metallic thin plates, followed by preheating at 180° C. for 5 minutes using a hot press. Then, those sheets were thermo-compression bonded at a press pressure of 15 kgf/cm$^2$ for 60 seconds, and cooled immediately with a hydraulic press, which was cooled by passing water, at a press pressure of 10 kg/cm$^2$ for 2 minutes, to obtain a laminate (length: 360 mm, width: 120 mm, total thickness: 1.95 mm) consisting of a layer of the sheet (7) having a thickness of 0.95 mm and a layer of the sheet (8) having a thickness of 1 mm. The laminate was cut into a specimen of a given size (length: 356 mm, width: 102 mm) suitable for the test of FMVSS-302.

The laminate thus obtained was contacted with flame from each side of the flame-retardant olefin resin layer and the olefin resin layer, to evaluate flame retardance. In the flame contact from each side, the laminate did not catch fire and showed self-extinguishing properties. Besides, smoke was hardly generated. The results of the evaluation for bleed resistance on the side of the sheet (8), gloss before immersion and gloss after immersion are set forth in Table 1.

Example 5

The composition (1) was melted at 200° C. by means of a hot press and preheated for 5 minutes using a copper frame having a thickness of 3 mm, followed by pressing at a press pressure of 100 kgf/cm$^2$ for 1 minute. Then, the pressed composition was cooled with a cooling press, which was cooled by passing water, at a press pressure of 100 kg/cm$^2$ for 2 minutes, to obtain a sheet having a thickness of 3 mm (referred to as "sheet (9)").

Similarly, the composition (2) was melted at 200° C. by means of a hot press and preheated for 5 minutes using a copper frame having a thickness of 2 mm, followed by pressing at a press pressure of 100 kgf/cm$^2$ for 1 minute. Then, the pressed composition was cooled with a cooling press, which was cooled by passing water, at a press pressure of 100 kg/cm$^2$ for 2 minutes, to obtain a sheet having a thickness of 2 mm (referred to as "sheet (10)").

The sheet (9) and the sheet (10) were superposed one upon the other, and they were placed between metallic thin plates, followed by preheating at 180° C. for 5 minutes using a hot press. Then, those sheets were thermo-compression bonded at a press pressure of 10 kgf/cm$^2$ for 60 seconds, and cooled immediately with a hydraulic press, which was cooled by passing water, at a press pressure of 15 kg/cm$^2$ for 2 minutes, to obtain a laminate (length: 360 mm, width: 120 mm, total thickness: 4.8 mm) consisting of a layer of the sheet (9) having a thickness of 2.9 mm and a layer of the sheet (10) having a thickness of 1.9 mm. The laminate was cut into a specimen of a given size (length: 356 mm, width: 102 mm) suitable for the test of FMVSS-302.

The laminate thus obtained was contacted with flame from each side of the flame-retardant olefin resin layer and the olefin resin layer, to evaluate flame retardance. In the flame contact from each side, the laminate did not catch fire and showed self-extinguishing properties. Besides, smoke was hardly generated. The results of the evaluation for bleed resistance on the side of the sheet (10), gloss before immersion and gloss after immersion are set forth in Table 1.

Comparative Example 1

The sheet (2) was cut into a specimen of a given size (length: 356 mm, width: 102 mm) suitable for the test of FMVSS-302.

The resulting sheet was evaluated for flame retardance. As a result, the burning rate became 2,500 mm/min, and the sheet showed flammability. The results of the evaluation for bleed resistance, gloss before immersion and gloss after immersion are set forth in Table 1.

Comparative Example 2

The sheet (4) was cut into a specimen of a given size (length: 356 mm, width: 102 mm) suitable for the test of FMVSS-302.

The resulting sheet was evaluated for flame retardance. As a result, the burning rate became 1,200 mm/min, and the sheet showed flammability. The results of the evaluation for bleed resistance, gloss before immersion and gloss after immersion are set forth in Table 1.

Comparative Example 3

The sheet (8) was cut into a specimen of a given size (length: 356 mm, width: 102 mm) suitable for the test of FMVSS-302.

The resulting sheet was evaluated on the flame retardance. As a result, the burning rate became 130 mm/min, and the sheet showed flammability. The results of evaluation on bleed resistance, gloss before immersion and gloss after immersion are set forth in Table 1.

Comparative Example 4

The sheet (1) was cut into a specimen of a given size (length: 356 mm, width: 102 mm) suitable for the test of FMVSS-302.

The resulting sheet was evaluated for flame retardance. As a result, the sheet did not catch fire and showed self-extinguishing properties. Besides, smoke was hardly generated. The results of the evaluation for bleed resistance, gloss before immersion and gloss after immersion are set forth in Table 1.

Comparative Example 5

The sheet (3) was cut into a specimen of a given size (length: 356 mm, width: 102 mm) suitable for the test of FMVSS-302.

The resulting sheet was evaluated for flame retardance. As a result, the sheet did not catch fire and showed self-extinguishing properties. Besides, smoke was hardly generated. The results of the evaluation for bleed resistance, gloss before immersion and gloss after immersion are set forth in Table 1.

Comparative Example 6

The sheet (7) was cut into a specimen of a given size (length: 356 mm, width: 102 mm) suitable for the test of FMVSS-302.

The resulting sheet was evaluated for flame retardance. As a result, the sheet did not catch fire and showed self-extinguishing properties. Besides, smoke was hardly generated. The results of the evaluation for bleed resistance, gloss before immersion and gloss after immersion are set forth in Table 1.

Example 6

The composition (1) was molded into a sheet having a thickness of 0.2 mm (referred to as "sheet (11)") by means of the extruder (1) equipped with a T-die having a width of 150 mm.

The composition (2) was molded into a sheet having a thickness of 0.25 mm (referred to as "sheet (12)") by means of the extruder (1) equipped with a T-die having a width of 150 mm.

The sheet (11) and the sheet (12) were superposed one upon the other, and they were placed between metallic thin plates, followed by preheating at 160° C. for 2 minutes using a hot press. Then, those sheets were thermo-compression bonded at a press pressure of 10 kgf/cm$^2$ for 60 seconds, and cooled immediately with a hydraulic press, which was cooled by passing water, at a press pressure of 5 kg/cm$^2$ for 1 minute, to obtain a laminate (length: 360 mm, width: 120 mm, total thickness: 0.42 mm) consisting of a layer of the sheet (11) having a thickness of 0.19 mm and a layer of the sheet (12) having a thickness of 0.23 mm. The laminate was cut into a specimen of a given size (length: 356 mm, width: 102 mm) suitable for the test of FMVSS-302.

The laminate thus obtained was contacted with flame from the side of the sheet (11), to evaluate flame retardance. In the flame contact from the side of the sheet (11), the laminate did not catch fire and showed self-extinguishing properties. Besides, smoke was hardly generated. Further, the laminate was contacted with flame from the side of the sheet (12), to evaluate flame retardance. After 7 seconds from stop of the flame contact, the fire flame went out, and the laminate showed self-extinguishing properties Besides, smoke was hardly generated. The results of the evaluation for bleed resistance on the side of the sheet (12), gloss before immersion and gloss after immersion are set forth in Table 1.

Example 7

The composition (1) was molded into a sheet having a thickness of 0.5 mm (referred to as "sheet (13)") by means of the extruder (1) equipped with a T-die having a width of 150 mm.

The sheet (13) and the sheet (2) were superposed one upon the other, and they were placed between metallic thin plates, followed by preheating at 160° C. for 2 minutes using a hot press. Then, those sheets were thermo-compression bonded at a press pressure of 10 kgf/cm$^2$ for 60 seconds, and cooled immediately with a hydraulic press, which was cooled by passing water, at a press pressure of 5 kg/cm$^2$ for 1 minute, to obtain a laminate (length: 360 mm, width: 120 mm, total thickness: 0.49 mm) consisting of a layer of the sheet (13) having a thickness of 0.48 mm and a layer of the sheet (2) having a thickness of 0.01 mm. The laminate was cut into a specimen of a given size (length: 356 mm, width: 102 mm) suitable for the test of FMVSS-302.

The laminate thus obtained was contacted with flame from each side of the sheet (13) the sheet (2), to evaluate flame retardance. In each case of flame contact from both sides, the laminate showed self-extinguishing properties, and smoke was hardly generated. The results of the evaluation for bleed resistance on the side of the sheet (2), gloss before immersion and gloss after immersion are set forth in Table 1.

Example 8

On both surfaces of the sheet (11) were placed the sheets (4) (i.e., the sheet (11) was sandwiched between the sheets (4)), and they were further placed between metallic thin plates, followed by preheating at 160° C. for 2 minutes using a hot press. Then, those sheets were thermo-compression bonded at a press pressure of 10 kgf/cm$^2$ for 60 seconds, and cooled immediately with a hydraulic press, which was cooled by passing water, at a press pressure of 5 kg/cm$^2$ for 1 minute, to obtain a laminate (length: 360 mm, width: 120 mm, total thickness: 0.38 mm) consisting of a layer of the sheet (11) having a thickness of 0.19 mm as an intermediate layer, a layer of the sheet (4) having a thickness of 0.09 mm as one surface layer and a layer of the sheet (4) having a thickness of 0.1 mm as the other surface layer (total thickness of the sheets (4): 0.19 mm). The laminate was cut into a specimen of a given size (length: 356 mm, width: 102 mm) suitable for the test of FMVSS-302.

The laminate thus obtained was contacted with flame, to evaluate flame retardance. As a result, the laminate did not catch fire and showed self-extinguishing properties. Besides, smoke was hardly generated. The results of the evaluation for bleed resistance, gloss before immersion and gloss after immersion are set forth in Table 1.

Example 9

The composition (1) was molded into a sheet having a thickness of 0.4 mm (referred to as "sheet (14)") by means of the extruder (1) equipped with a T-die having a width of 150 mm.

On both surfaces of the sheet (14) were placed the sheets (4) (i.e., the sheet (14) was sandwiched between the sheets (4)), and they were further placed between metallic thin plates, followed by preheating at 160° C. for 2 minutes using a hot press. Then, those sheets were thermo-compression bonded at a press pressure of 10 kgf/cm² for 60 seconds, and cooled immediately with a hydraulic press, which was cooled by passing water, at a press pressure of 5 kg/cm² for 1 minute, to obtain a laminate (length: 360 mm, width: 120 mm, total thickness: 0.59 mm) consisting of a layer of the sheet (14) having a thickness of 0.4 mm as an intermediate layer, a layer of the sheet (4) having a thickness of 0.09 mm as one surface layer and a layer of the sheet (4) having a thickness of 0.1 mm as the other surface layer (total thickness of the sheets (4): 0.19 mm). The laminate was cut into a specimen of a given size (length: 356 mm, width: 102 mm) suitable for the test of FMVSS-302.

The laminate thus obtained was contacted with flame, to evaluate flame retardance. As a result, the laminate did not catch fire and showed self-extinguishing properties. Besides, smoke was hardly generated. The results of the evaluation for bleed resistance, gloss before immersion and gloss after immersion are set forth in Table 1.

Example 10

In a Henschel mixer, 29% by weight of PP(1), 49% by weight of PA(1), 21% by weight of NC(1), 0.3% by weight of AD(1), 0.3% by weight of AD(2) and 0.4% by weight of AD(3) were mixed together, and the resulting mixture was melt kneaded at a temperature of 230° C. by means of a twin-screw extruder (screw diameter: 44 mm, L/D=45, trade name: KTX-44, manufactured by Kobe Steel, Ltd.) to obtain a composition (referred to as "composition (3)") in the form of pellets. The composition (3) was melted at 200° C. by means of a hot press and preheated for 5 minutes using a copper frame having a thickness of 0.5 mm, followed by pressing at a press pressure of 100 kgf/cm² for 1 minute. Then, the pressed composition was cooled with a cooling press, which was cooled by passing water, at a press pressure of 100 kg/cm² for 2 minutes, to obtain a sheet having a thickness of 0.5 mm (referred to as "sheet (15)").

The composition (2) was melted at 200° C. by means of a hot press and preheated for 5 minutes using a copper frame having a thickness of 0.5 mm, followed by pressing at a press pressure of 100 kgf/cm² for 1 minute. Then, the pressed composition was cooled with a cooling press, which was cooled by passing water, at a press pressure of 100 kg/cm² for 2 minutes, to obtain a sheet having a thickness of 0.5 mm (referred to as "sheet (16)").

The sheet (15) and the sheet (16) were superposed one is upon the other, and they were placed between metallic thin plates, followed by preheating at 200° C. for 5 minutes using a hot press. Then, those sheets were thermo-compression bonded at a press pressure of 10 kgf/cm² for 60 seconds, and cooled immediately with a hydraulic press, which was cooled by passing water, at a press pressure of 10 kg/cm² for 2 minutes, to obtain a laminate (length: 360 mm, width: 120 mm, total thickness: 1 mm) consisting of a layer of the sheet (15) having a thickness of 0.5 mm and a layer of the sheet (16) having a thickness of 0.5 mm. The laminate was cut into a specimen of a given size (length: 356 mm, width: 102 mm) suitable for the test of FMVSS-302.

The laminate thus obtained was contacted with flame from each side of the sheet (15) the sheet (16), to evaluate flame retardance. In the flame contact from each side, the laminate did not catch fire and showed self-extinguishing properties. Besides, smoke was hardly generated. The results of the evaluation for bleed resistance on the side of the sheet (16), gloss before immersion and gloss after immersion are set forth in Table 1.

Example 11

In a Henschel mixer, 89% by weight of PP(1), 6% by weight of PA(1), 4% by weight of NC(1), 0.3% by weight of AD(1), 0.3% by weight of AD(2) and 0.4% by weight of AD(3) were mixed together, and the resulting mixture was melt kneaded at a temperature of 230° C. by means of a twin-screw extruder (screw diameter: 44 mm, L/D=45, trade name: KTX-44, manufactured by Kobe Steel, Ltd.) to obtain a composition (referred to as "composition (4)") in the form of pellets. The composition (4) was melted at 200° C. by means of a hot press and preheated for 5 minutes using a copper frame having a thickness of 0.5 mm, followed by pressing at a press pressure of 100 kgf/cm² for 1 minute. Then, the pressed composition was cooled with a cooling press, which was cooled by passing water, at a press pressure of 100 kg/cm² for 2 minutes, to obtain a sheet having a thickness of 0.5 mm (referred to as "sheet (17)").

The sheet (17) and the sheet (16) were superposed one upon the other, and they were placed between metallic thin plates, followed by preheating at 200° C. for 2 minutes using a hot press. Then, those sheets were thermo-compression bonded at a press pressure of 10 kgf/cm² for 60 seconds, and cooled immediately with a hydraulic press, which was cooled by passing water, at a press pressure of 5 kg/cm² for 2 minutes, to obtain a laminate (length: 360 mm, width; 120 mm, total Thickness: 1 mm) consisting of a layer of the sheet (17) having a thickness of 0.5 mm and a layer of the sheet (16) having a thickness of 0.5 mm. The laminate was cut into a specimen of a given size (length: 356 mm, width: 102 mm) suitable for the test of FMVSS-302.

The laminate thus obtained was contacted with flame from each side of the sheet (17) the sheet (16), to evaluate flame retardance. In the flame contact from each side, the fire flame went out within 10 seconds from stop of the flame contact, and the laminate showed self-extinguishing properties. Besides, smoke was hardly generated. The results of the evaluation for bleed resistance on the side of the sheet (16), gloss before immersion and gloss after immersion are set forth in Table 1.

Comparative Example 7

In a Henschel mixer, 94% by weight of PP(1), 3% by weight of PA(1), 2% by weight of NC(1), 0.3% by weight of AD(1), 0.3% by weight of AD(2) and 0.4% by weight of AD(3) were mixed together, and the resulting mixture was melt kneaded at a temperature of 200° C. by means of a twin-screw extruder (screw diameter: 44 mm, L/D=45, trade name: KTX-44, manufactured by Kobe Steel, Ltd.) to obtain a composition (referred to as "composition (5)") in the form of pellets. The composition (5) was molded into a sheet having a thickness of 0.2 mm (referred to as "sheet (18)") by means of the extruder (1) equipped with a T-die having a width of 150 mm.

The sheet (18) and the sheet (4) were superposed one upon the other, and they were placed between metallic thin plates, followed by preheating at 160° C. for 2 minutes using a hot press. Then, those sheets were thermo-compression bonded at a press pressure of 10 kgf/cm² for 60 seconds, and cooled immediately with a hydraulic press, which was cooled by passing water, at a press pressure of 5 kg/cm² for 2 minute, to obtain a laminate (length: 360 mm, width: 120 mm, total thickness: 0.28 mm) consisting of a layer of the sheet (18) having a thickness of 0.19 mm and a layer of the sheet (4) having a thickness of 0.09 mm. The laminate was cut into a specimen of a given size (length: 356 mm, width; 102 mm) suitable for the test of FMVSS-302.

The laminate thus obtained was contacted with flame from each side of the sheet (18) the sheet (4), to evaluate flame retardance. In the flame contact from each side, the burning rate became not less than 450 mm/min, and the laminate showed flammability. The results of the evaluation for bleed resistance on the side of the sheet (4), gloss before immersion and gloss after immersion are set forth in Table 1.

Example 12

In a Henschel mixer, 69% by weight of PP(1), 27% by weight of PA(1), 3% by weight of NC(1), 0.3% by weight of AD(1), 0.3% by weight of AD(2) and 0.4% by weight of AD(3) were mixed together, and the resulting mixture was melt kneaded at a temperature of 220° C. by means of a twin-screw extruder (screw diameter: 44 mm, L/D=45, trade name: KTX-44, manufactured by Kobe Steel, Ltd.) to obtain a composition (referred to as "composition (6)") in the form of pellets. The composition (6) was molded into a sheet having a thickness of 0.2 mm (referred to as "sheet (19)") by means of the extruder (1) equipped with a T-die having a width of 150 mm.

The sheet (19) and the sheet (4) were superposed one upon the other, and they were placed between metallic thin plates, followed by preheating at 160° C. for 2 minutes using a hot press. Then, those sheets were thermo-compression bonded at a press pressure of 10 kgf/cm² for 60 seconds, and cooled immediately with a hydraulic press, which was cooled by passing water, at a press pressure of 5 kg/cm² for 2 minutes, to obtain a laminate (length: 360 mm, width: 120 mm, total thickness: 0.29 mm) consisting of a layer of the sheet (19) having a thickness of 0.19 mm and a layer of the sheet (4) having a thickness of 0.1 mm. The laminate was cut into a specimen of a given size (length: 356 mm, width: 102 mm) suitable for the test of FMVSS-302.

The laminate thus obtained was contacted with flame from each side of the sheet (19) the sheet (4), to evaluate flame retardance. In the flame contact from each side, the laminate did not catch fire and showed self-extinguishing properties. Besides, smoke was hardly generated. The results of the evaluation on bleed resistance on the side of the sheet (4), gloss before immersion and gloss after immersion are set forth in Table 1.

Example 13

In a Henschel mixer, 69% by weight of PP(1), 7.5% by weight of PA(1), 22.5% by weight of NC(1), 0.3% by weight of AD(1), 0.3% by weight of AD(2) and 0.4% by weight of AD(3) were mixed together, and the resulting mixture was melt kneaded at a temperature of 220° C. by means of a twin-screw extruder (screw diameter: 44 mm, L/D=45, trade name: KTX-44, manufactured by Kobe Steel, Ltd.) to obtain a composition (referred to as "composition (7)") in the form of pellets. The composition (7) was molded into a sheet having a thickness of 0.2 mm (referred to as "sheet (20)") by means of the extruder (1) equipped with a T-die having a width of 150 mm.

The sheet (20) and the sheet (4) were superposed one upon the other, and they were placed between metallic thin plates, followed by preheating at 160° C. for 2 minutes using a hot press. Then, those sheets were thermo-compression bonded at a press pressure of 10 kgf/cm² for 60 seconds, and cooled immediately with a hydraulic press, which was cooled by passing water, at a press pressure of 5 kg/cm² for 2 minutes, to obtain a laminate (length: 360 mm, width: 120 mm, total thickness: 0.27 mm) consisting of a layer of the sheet (20) having a thickness of 0.18 mm and a layer of the sheet (4) having a thickness of 0.09 mm. The laminate was cut into a specimen of a given size (length: 356 mm, width: 102 mm) suitable for the test of FMVSS-302.

The laminate thus obtained was contacted with flame from each side of the sheet (20) and the sheet (4), to evaluate flame retardance. In the flame contact from each side, the laminate did not catch fire and showed self-extinguishing properties. Besides, smoke was hardly generated. The results of the evaluation for bleed resistance on the side of the sheet (4), gloss before immersion and gloss after immersion are set forth in Table 1.

Comparative Example 8

In a Henschel mixer, 69% by weight of PP(1), 29% by weight of PA(1), 1% by weight of NC(1), 0.3% by weight of AD(1), 0.3% by weight of AD(2) and 0.4% by weight of AD(3) were mixed together, and the resulting mixture was melt kneaded at a temperature of 220° C. by means of a twin-screw extruder (screw diameter: 44 mm, L/D=45, trade name: KTX-44, manufactured by Kobe Steel, Ltd.) to obtain a composition (referred to as "composition (8)") in the form of pellets. The composition (6) was molded into a sheet having a thickness of 0.2 mm (referred to as "sheet (21)") by means of the extruder (1) equipped with a T-die having a width of 150 mm.

The sheet (21) and the sheet (4) were superposed one upon the other, and they were placed between metallic thin plates, followed by preheating at 160° C. for 2 minutes using a hot press. Then, those sheets were thermo-compression bonded at a press pressure of 10 kgf/cm² for 60 seconds, and cooled immediately with a hydraulic press, which was cooled by passing water, at a press pressure of 5 kg/cm² for 2 minute, to obtain a laminate (length: 360 mm, width: 120 mm, total thickness: 0.29 mm) consisting of a layer of the sheet (21) having a thickness of 0.2 mm and a layer of the sheet (4) having a thickness of 0.09 mm. The laminate was cut into a specimen of a given size (length: 356 mm, width: 102 mm) suitable for the test of FMVSS-302.

The laminate thus obtained was contacted with flame from each side of the sheet (21) the sheet (4), to evaluate flame retardance. In the flame contact from each side, the burning rate became 220 mm/min, and the laminate showed flammability. The results of the evaluation for bleed resistance on the side of the sheet (4), gloss before immersion and gloss after immersion are set forth in Table 1.

Comparative Example 9

In a Henschel mixer, 69% by weight of PP(1), 3% by weight of PA(1), 27% by weight of NC(1), 0.3% by weight of AD(1), 0.3% by weight of AD(2) and 0.4% by weight of AD(3) were mixed together, and the resulting mixture was melt kneaded at a temperature of 220° C. by means of a twin-screw extruder (screw diameter: 44 mm, L/D=45, trade name: KTX-44, manufactured by Kobe Steel, Ltd.) to obtain a composition (referred to as "composition (9)") in the form of pellets. The composition (9) was molded into a sheet having a thickness of 0.2 mm (referred to as "sheet (22)") by means of the extruder (1) equipped with a T-die having a width of 150 mm.

The sheet (22) and the sheet (4) were superposed one upon the other, and they were placed between metallic thin plates, followed by preheating at 160° C. for 2 minutes using a hot press. Then, those sheets were thermo-compression bonded at a press pressure of 10 kgf/cm² for 60 seconds, and cooled immediately with a hydraulic press, which was cooled by passing water, at a press pressure of 5 kg/cm² for 2 minutes, to obtain a laminate (length: 360 mm, width: 120 mm, total thickness: 0.28 mm) consisting of a layer of the sheet (22) having a thickness of 0.19 mm and a layer of the sheet (4) having a thickness of 0.09 mm. The laminate was cut into a specimen of a given size (length: 356 mm, width: 102 mm) suitable for the test of FMVSS-302.

The laminate thus obtained was contacted with flame from each side of the sheet (22) the sheet (4), to evaluate flame retardance. In the flame contact from each side, the burning rate became not less than 370 mm/min, and the laminate showed flammability. The results of the evaluation for bleed resistance on the side of the sheet (4), gloss before immersion and gloss after immersion are set forth in Table 1.

Example 14

The composition (1) was fed to one extruder of a multi-layer extruding apparatus of feed block-type equipped with two extruders, and the composition (2) was fed to the other extruder of the apparatus. Then, those compositions were coextruded to obtain a laminate (total thickness: 0.35 mm) consisting of a layer of the composition (1) having a thickness of 0.2 mm and a layer of the composition (2) having a thickness of 0.15 mm. The laminate was cut into a specimen of a given size (length; 356 mm, width: 102 mm) suitable for the test of FMVSS-302.

The laminate thus obtained was contacted with flame from each side of the layers of the composition (1) and the composition (2), to evaluate flame retardance. In the flame contact from each side, the laminate did not catch fire and showed self-extinguishing properties. Besides, smoke was hardly generated. The results of the evaluation for bleed resistance on the side of the layer of the composition (2), gloss before immersion and gloss after immersion are set forth in Table 1.

Comparative Example 10

In a Henschel mixer, 69.4% by weight of PP(2), 22% by weight of HA(1), 8% by weight of AD(4), 0.3% by weight of AD(1) as a stabilizer and 0.3% by weight of AD(2) as a stabilizer were mixed together, and the resulting mixture was melt kneaded at a temperature of 200° C. by means of a twin-screw extruder (screw diameter; 44 mm, L/D=45, trade name: KTX-44, manufactured by Kobe Steel, Ltd.) to obtain a composition (referred to as "composition (10)") in the form of pellets. The composition (10) was molded into a sheet having a thickness of 0.5 mm (referred to as "sheet (23)") by means of the extruder (1) equipped with a T-die having a width of 150 mm.

The sheet (23) and the sheet (16) were superposed one upon the other, and they were placed between metallic thin plates, followed by preheating at 160° C. for 2 minutes using a hot press. Then, those sheets were thermo-compression bonded at a press pressure of 10 kgf/cm² for 60 seconds, and cooled immediately with a hydraulic press, which was cooled by passing water, at a press pressure of 2 kg/cm² for 1 minute, to obtain a laminate (length: 360 mm, width: 120 mm, total thickness: 0.97 mm) consisting of a layer of the sheet (23) having a thickness of 0.49 mm and a layer of the sheet (16) having a thickness of 0.48 mm. The laminate was cut into a specimen of a given size (length: 356 mm, width: 102 mm) suitable for the test of FMVSS-302.

The laminate thus obtained was contacted with flame from each side of the sheet (23) the sheet (16), to evaluate flame retardance. In the flame contact from each side, the laminate showed self-extinguishing properties, but black smoke was greatly generated when the laminate was contacted with flame.

Example 13

The composition (3) was fed to one extruder of a multi-layer extruding apparatus of feed block type equipped with three extruders, the composition (2) was fed to another extruder of the apparatus, and the composition (1) was fed to the last extruder of the apparatus. Then, those compositions were coextruded to obtain a laminate (total thickness: 0.35 mm) consisting of a layer of the composition (3) having a thickness of 0.1 mm as one surface layer, a layer of the composition (2) having a thickness of 0.15 mm as the other surface layer, and a layer of the composition (1) having a thickness of 0.1 mm as an intermediate layer. The laminate was cut into a specimen of a given size (length: 356 mm, width: 102 mm) suitable for the test of FMVSS-302.

The laminate thus obtained was contacted with flame from each side of the layers of the composition (2) and the composition (3), to evaluate flame retardance. In the flame contact from each side, the laminate did not catch fire and showed self-extinguishing properties. Besides, smoke was hardly generated. The results of the evaluation for bleed resistance on the side of the layer of the composition (2), gloss before immersion and gloss after immersion are set forth in Table 1.

TABLE 1

|  | Bleed Resistance | Gloss before Immersion | Gloss after Immersion |
| --- | --- | --- | --- |
| Ex. 1 | A | 93 | 87 |
| Ex. 2 | A | 93 | 88 |
| Ex. 3 | A | 89 | 82 |
| Ex. 4 | A | 89 | 83 |
| Ex. 5 | A | 88 | 82 |
| Ex. 6 | A | 85 | 79 |
| Ex. 7 | A | 74 | 65 |
| Ex. 8 | A | 83 | 78 |
| Ex. 9 | A | 84 | 80 |
| Ex. 10 | A | 83 | 77 |
| Ex. 11 | A | 92 | 87 |
| Ex. 12 | A | 90 | 85 |
| Ex. 13 | A | 88 | 82 |
| Ex. 14 | A | 92 | 87 |
| Ex. 15 | A | 88 | 84 |
| Comp. Ex. 1 | A | 90 | 86 |
| Comp. Ex. 2 | A | 88 | 84 |
| Comp. Ex. 3 | A | 86 | 80 |
| Comp. Ex. 4 | B | 50 | 35 |
| Comp. Ex. 5 | B | 48 | 28 |
| Comp. Ex. 6 | B | 44 | 25 |

TABLE 1-continued

|  | Bleed Resistance | Gloss before Immersion | Gloss after Immersion |
|---|---|---|---|
| Comp. Ex. 7 | A | 94 | 88 |
| Comp. Ex. 8 | A | 89 | 84 |
| Comp. Ex. 9 | A | 90 | 86 |
| Comp. Ex. 10 | A | 80 | 74 |

Comparative Examples 1 to 3 are each a sheet having a single-layer structure of only the layer (F) used in the invention (i.e., the layer (E) is not laminated on the layer (F)), so that each of these laminates is not suitable as the flame-retardant resin laminate of the invention.

Comparative Examples 4 to 6 are each a sheet having a single-layer structure of only the layer (E) used in the invention (i.e., the layer (E) is not laminated on the layer (F)), so that each of these laminates is not suitable as the flame-retardant resin laminate of the invention.

Comparative Example 7 is a laminate consisting of a layer of the sheet (18) formed from a composition containing 94% by weight of PP(1) and the layer (F) used in the invention, so that this laminate is not suitable as the flame-retardant resin laminate of the invention.

Comparative Example 8 is a laminate using the composition (8) having a weight ratio of NC(1) to PA(1) of 0.03 (NC(1)/PA(1)), and Comparative Example 9 is a laminate using the composition (9) having a weight ratio of NC(1) to PA(1) of 9 (NC(1)/PA(1)), so that each of these laminate is not suitable as the flame-retardant resin laminate of the invention.

What is claimed is:

1. A flame-retardant resin laminate comprising at least one layer (E) of a flame-retardant olefin resin composition and at least one layer (F) of an olefin resin (G), wherein the flame-retardant olefin resin composition comprises, relative to the total amount of the flame-retardant olefin composition, 2.5 to 67% by weight of ammonium polyphosphate, 0.4 to 52.5% by weight of a nitrogen-containing organic compound, and 30 to 90% by weight of an olefin resin (C), said laminate has a weight ratio of the nitrogen-containing organic compound to the ammonium polyphosphate of 0.05 to 3, and a thickness of 0.02 to 5 mm, and the total thickness of at least one of said layers (E) divided by the total thickness of at least one of said layers (F) is 0.8 to 50.

2. The flame-retardant resin laminate as claimed in claim 1, wherein the olefin resin (C) is selected from the group consisting of a crystalline ethylene homopolymer, a crystalline ethylene/α-olefin copolymer, a crystalline propylene/α-olefin copolymer, and a crystalline propylene homopolymer.

3. The flame-retardant resin laminate as claimed in claim 1, wherein the nitrogen-containing organic compound is selected from the group consisting of a polymer comprising units represented by the following formula (1), a reaction product of cyanuric chloride and diamine, a reaction product of ethyleneurea and aldehyde, and a reaction product of ethylenethiourea and aldehyde

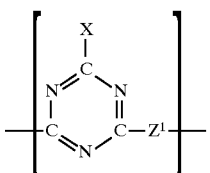

wherein X is an alkylamino group represented by —NHR$^1$ or NR$^2$R$^3$ (R$^1$, R$^2$, and R$^3$ are each a linear or branched alkyl group of 1 to 6 carbon atoms, and R$^2$ and R$^3$ may be identical to or different from each other), a morpholino group, a piperidino groups, or a hydroxyalkylamino group represented by —NHR$^4$ or —NR$^5$R$^6$ (R$^4$, R$^5$, and R$^6$ are each a linear or branched hydroxyalkyl group of 2 to 6 carbon atoms, and R$^5$ and R$^6$ may be identical to or different from each other), and Z$^1$ is a piperazinylene group, a group represented by —NH(CH$_2$)$_m$NH— (m is 2 to 6), or a group represented by —NR$^7$(CH$_2$)$_l$R$^8$N— (l is 2 to 6, R$^7$ and R$^8$ are each a linear or branched alkyl group of 1 to 6 carbon atoms or linear or branched hydroalkyl group of 2 to 6 carbon atoms, R$^7$ and R$^8$ are the same or different from each other, and at least one of R$^7$ and R$^8$ is a hydroxyethyl group.

4. The flame-retardant resin laminate as claimed in claim 1, wherein the at least one layer (F) comprises a stretched layer of the olefin resin (G).

5. The flame-retardant resin laminate as claimed in claim 1, wherein the at least one layer (E) comprises an intermediate layer and the at least one layer (F) comprises a protective surface layer and a back surface layer, said at least one intermediate layer (E) being interposed between said protective surface and said back surface layer.

6. The flame-retardant resin laminate as claimed in claim 2, wherein said laminate has a thickness of 0.02 to 5 mm.

7. The flame-retardant resin laminate as claimed in claim 2, wherein the nitrogen-containing organic compound is selected from the group consisting of a polymer comprising units represented by the following formula (1), a reaction product of cyanuric chloride and diamine, a reaction product of ethyleneurea and aldehyde, and a reaction product of ethylenethiourea and aldehyde

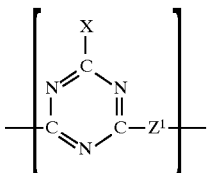

wherein X is an alkylamino group represented by —NHR$^1$ or NR$^2$R$^3$ (R$^1$, R$^2$, and R$^3$ are each a linear or branched alkyl group of 1 to 6 carbon atoms, and R$^2$ and R$^3$ may be identical to or different from each other), a morpholino group, a piperidino group, or a hydroxyalkylamino group represented by —NHR$^4$ or —NR$^5$R$^6$ (R$^4$, R$^5$, and R$^6$ are each a linear or branched hydroxyalkyl group of 2 to 6 carbon atoms, and R$^5$ and R$^6$ may be identical to or different from each other), and Z$^1$ is a piperazinylene group, a group represented by —NH(CH$_2$)$_m$NH— (m is 2 to 6), or a group represented by —NR$^7$(CH$_2$)$_l$R$^8$N— (l is 2 to 6, R$^7$ and R$^8$ are each a linear or branched alkyl group of 1 to 6 carbon atoms or linear or branched hydroalkyl group of 2 to 6 carbon atoms, R$^7$ and R$^8$ are the same or different from each other, and at least one of R$^7$ and R$^8$ is a hydroxyethyl group.

8. The flame-retardant resin laminate as claimed in claim 2, wherein the at least one layer (F) comprises a stretched layer of the olefin resin (G).

9. The flame-retardant resin laminate as claimed in claim 3, wherein the at least one layer (F) comprises a stretched layer of the olefin resin (G).

10. The flame-retardant resin laminate as claimed in claim 3, wherein the at least one layer (E) comprises an intermediate layer and the at least one layer (F) comprises a protective surface layer and a back surface layer, said at least one intermediate layer (E) being interposed between said protective surface and said back surface layer.

11. The flame-retardant resin laminate as claimed in claim 2, wherein the at least one layer (E) comprises an intermediate layer and the at least one layer (F) comprises a protective surface layer and a back surface layer, said at least one intermediate layer (E) being interposed between said protective surface and said back surface layer.

12. The flame-retardant resin laminate as claimed in claim 4, wherein the at least one layer (E) comprises an intermediate layer and the at least one layer (F) comprises a protective surface layer and a back surface layer, said at least one intermediate layer (E) being interposed between said protective surface and said back surface layer.

* * * * *